Figure 1:
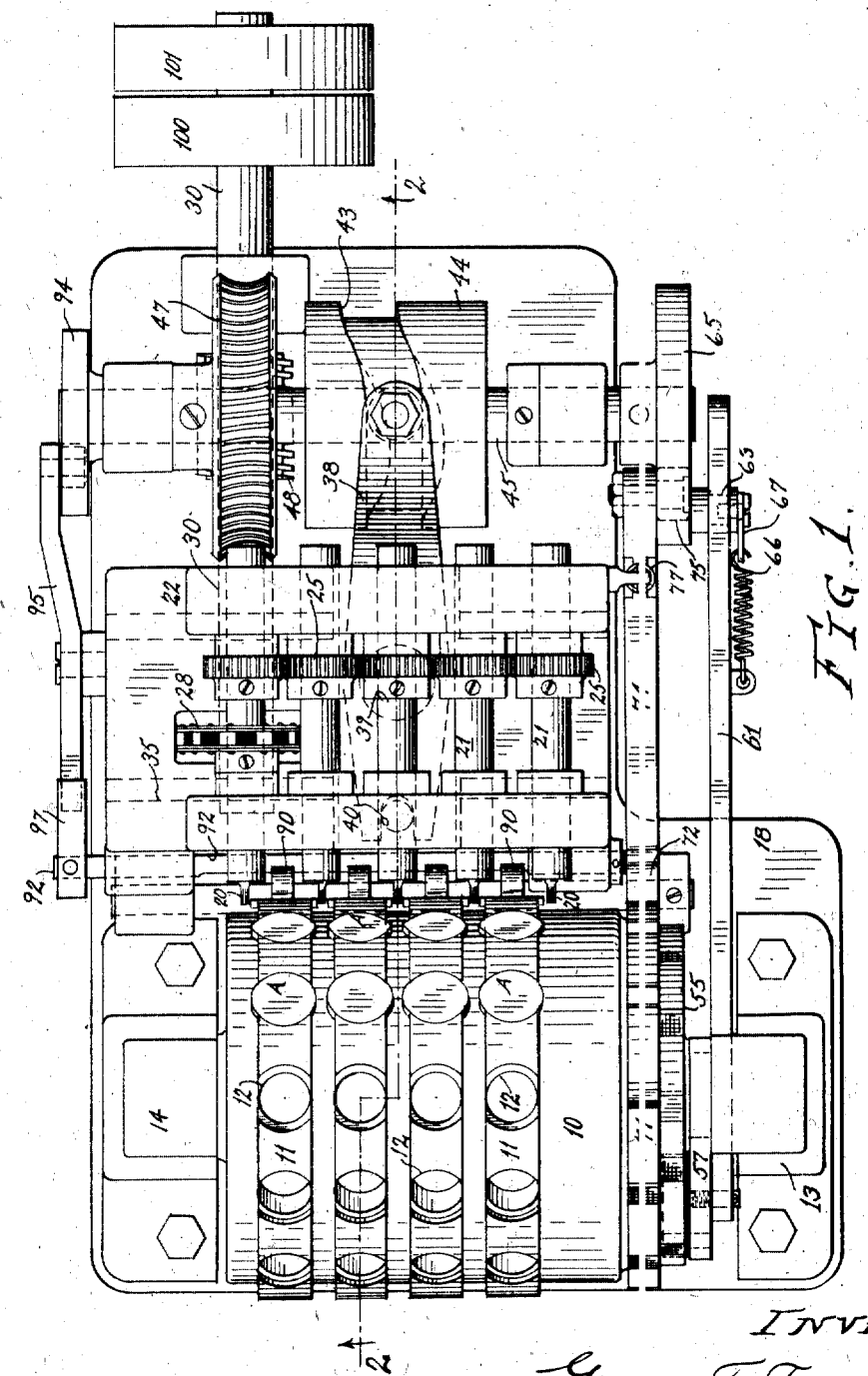

G. T. TRUNDLE, Jr.
MILLING MACHINE.
APPLICATION FILED AUG. 26, 1915.

1,216,018.

Patented Feb. 13, 1917.
3 SHEETS—SHEET 1.

INVENTOR.
George T. Trundle, Jr.
BY Albert H. Bates
ATTY

G. T. TRUNDLE, Jr.
MILLING MACHINE.
APPLICATION FILED AUG. 26, 1915.

1,216,018.

Patented Feb. 13, 1917.
3 SHEETS—SHEET 2.

INVENTOR:
George T. Trundle, Jr.
By Albert H. Bates
atty

G. T. TRUNDLE, Jr.
MILLING MACHINE.
APPLICATION FILED AUG. 26, 1915.
1,216,018.
Patented Feb. 13, 1917.
3 SHEETS—SHEET 3.
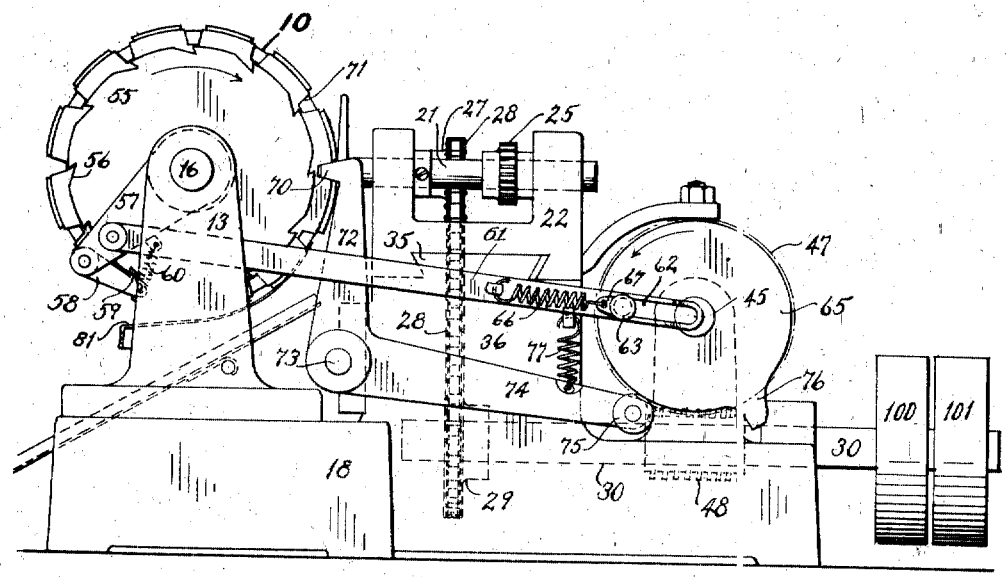
FIG. 4.
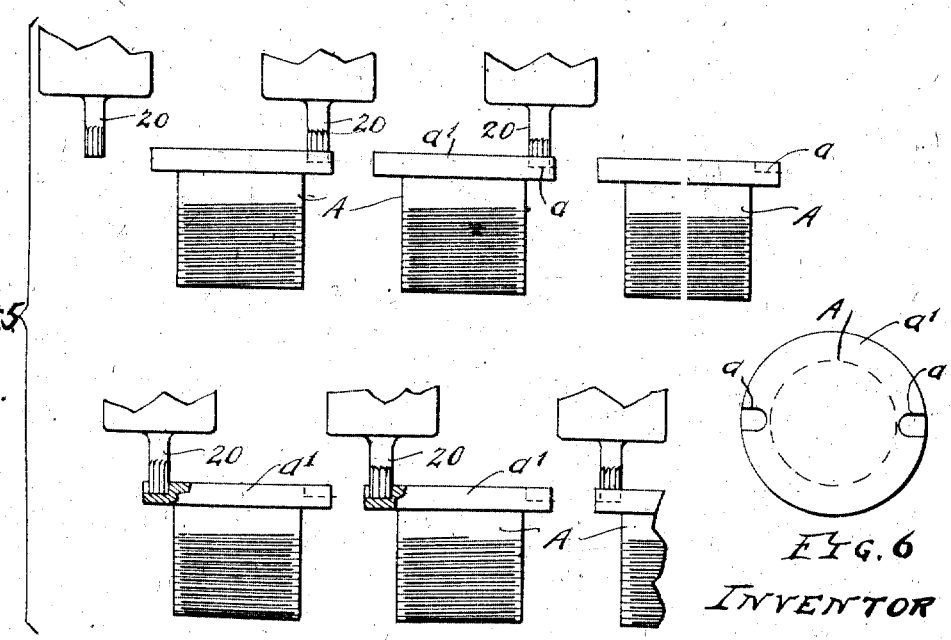
FIG. 5
FIG. 6
INVENTOR
George T. Trundle, Jr.
BY Albert H. Bates
ATTY

UNITED STATES PATENT OFFICE.

GEORGE T. TRUNDLE, JR., OF CLEVELAND, OHIO, ASSIGNOR TO THE AMERICAN MULTIGRAPH COMPANY, OF CLEVELAND, OHIO, A CORPORATION OF OHIO.

MILLING-MACHINE.

1,216,018.  Specification of Letters Patent.  Patented Feb. 13, 1917.

Application filed August 26, 1915. Serial No. 47,390.

*To all whom it may concern:*

Be it known that I, GEORGE T. TRUNDLE, Jr., a citizen of the United States, residing at Cleveland, in the county of Cuyahoga and State of Ohio, have invented a certain new and useful Improvement in Milling-Machines, of which the following is a full, clear, and exact description, reference being had to the accompanying drawings.

The object of this invention is to provide a simple and accurate machine for milling into an article from opposite sides, without the delay incident to turning the article on itself, as has heretofore been the practice. My machine has various uses, among which I may mention, by way of example, the milling of diametrically opposite notches, in a threaded article, for the reception of a spanner wrench. Another object is to provide for the simultaneous milling of a number of articles, thus increasing the rapidity of output.

To the above ends, I have devised a machine which in its preferred form may comprise a holder for sets of articles and a series of milling cutters (one more in number than the articles to be cut at any particular time) and mechanism for moving the holder to successively present different sets of articles to the cutters, and mechanism for bodily shifting the series of cutters relative to the articles in one direction and then in the opposite direction, enabling all the cutters but one at one end of the series to mill one side of all the articles in a set, and thereafter all the cutters except the one at the opposite end of the series to mill into the opposite side of all the articles in the set. The invention comprises the essential parts of such combination of mechanisms, and also the more particular embodiment thereof illustrated in the drawings herein and hereinafter more fully described.

Figure 2:
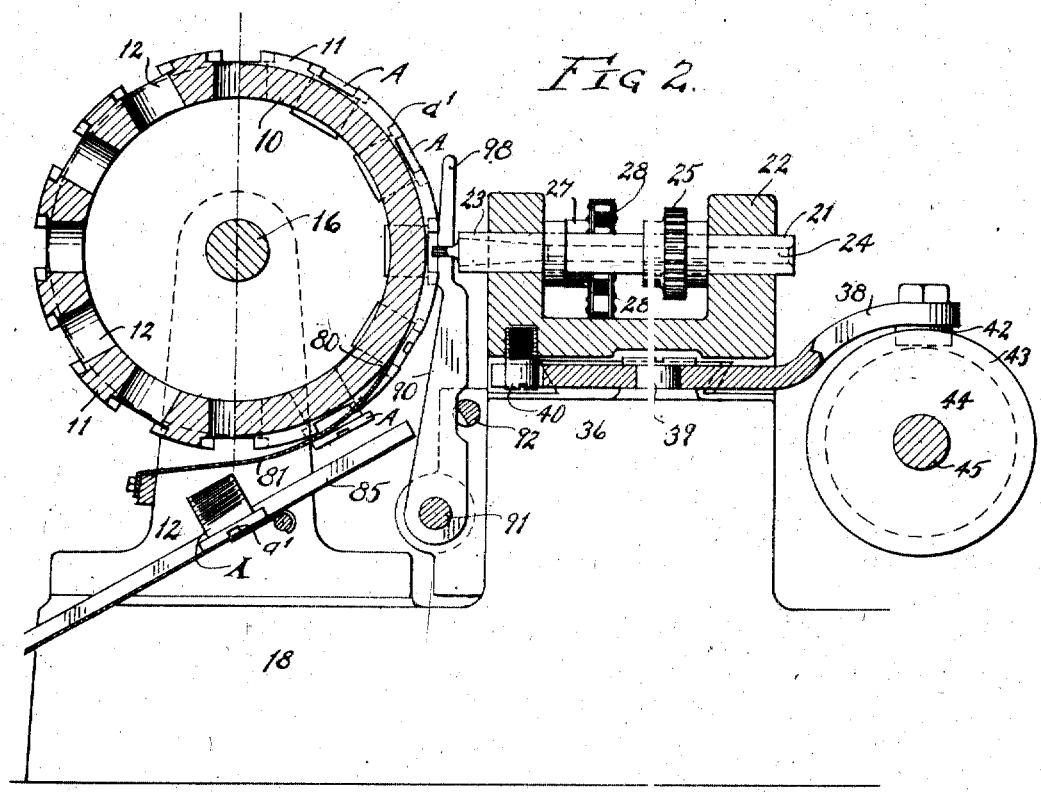
Figure 3:
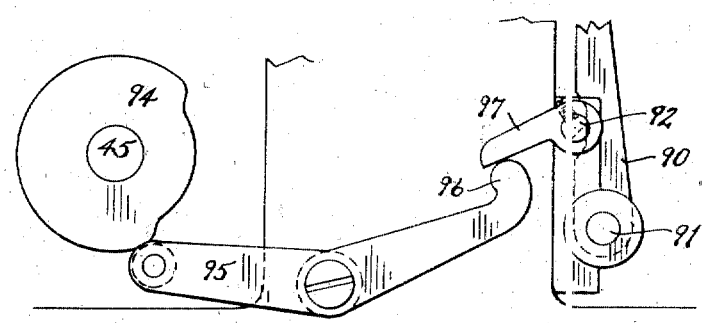

In the drawings, Figure 1 is a plan of my milling machine; Fig. 2 is a vertical section thereof substantially on the offset line 2—2 of Fig. 1; Fig. 3 is a detail, in side elevation, of clamping mechanism on that side of the machine which is at the left hand in Fig. 1; Fig. 4 is a side elevation of the machine on a smaller scale than the preceding figures looking in the same general direction as Fig 2; Fig. 5 is a diagrammatic plan illustrating two positions of the sets of cutters with reference to the same objects, which, in this case, are threaded plugs; Fig. 6 is a face view of such plug after being milled by this machine.

In the particular embodiment of the machine shown in the drawing, the mechanism is adapted to mill diametrically opposite notches $a$ in the head $a'$ of a screw threaded plug A. The machine acts on four of these plugs at a time, and hence five cutters are provided so that there are cutters on opposite sides of every plug. When the four plugs are brought into position for operation, the five cutters stand in a central position alongside of, but out of contact with, the various heads; then the set of cutters is shifted bodily in one direction to mill all of the notches in the left hand side, for example, of the plugs, and then shifted in the opposite direction to mill the other notches in the right hand side. Each of the three intermediate cutters thus act first on one plug and then on the adjacent plug, while the two extreme cutters are alternately active and idle.

The holder for the articles to be operated on consists of a hollow rotary drum 10 having circumferential ribs 11 in which are a large number of radial openings 12 adapted to be occupied by the plugs to be milled. As shown, there are four ribs and the corresponding openings in the different ribs aline, so that there are successive longitudinal rows or sets of four articles each. The drawing shows twelve sets of four openings each; though it is to be understood that the number of sets and the number of openings in a set may be varied, as desired. The drum has an axial shaft 16 journaled in standards 13 and 14, which rise from a suitable bed 18.

The milling cutters 20 are carried in suitable rotating spindles 21 journaled side by side in a shiftable carriage 22 each cutter has preferably a tapered shank 23 enabling it to be driven into rigid operating engagement with the spindle. To enable its removal, the spindle has a bore 24 extending to the opposite end through which a pin may be inserted to drive out the cutter when desired. Each spindle 21 is provided with a gear 25, secured to it, the successive gears meshing with each other.

On one of the spindles 21 (one of the outside ones in the illustration) is provided a sprocket 27. From this sprocket runs a chain 28 to a sprocket 29 (Fig. 4) on a drive shaft 30. Accordingly, the rotation of the drive shaft rotates all of the spindles simultaneously and at equal speed, each one turning in the opposite direction from its neighbor. The milling cutters, however, are alternately reversed so that the cutting edge is proper for the direction of rotation given.

The carriage 22 is adapted to be shifted transversely of the machine, a dove-tailed tongue and groove slideway 35 on a portion 36 of the bed being provided for this purpose. The shifting is effected by a lever 38 which is pivoted to the bed at 39 and at its forward ends forks around a pin 40 depending from the carriage. The rear end of the lever 38 carries a roller 42 which occupies the groove 43 of a double crown cam 44 on a transverse shaft 45. This shaft is shown as provided with a worm wheel 47 meshing with a worm 48 on the drive shaft 30.

By reason of the sprocket chain drive for the spindles they may be shifted transversely without interfering with their rotation. When the shaft 30 is rotated, the spindles are not only driven, but the carriage is shifted in accordance with the groove of the cam 44. This cam is so shaped that it shifts the spindles from the central position, first in one direction and then in the opposite direction, past the central point to an equal distance at the other side, then back to the central point, where a straight portion of the cam holds the spindles in position for a definite time. During this period of rest in the travel of the spindles the drum 10 is given a partial rotation to present a fresh set of plugs to the cutters. This positioning of the work will now be described.

Rigid on the drum 10 is a ratchet wheel 55 having as many notches 56 as there are sets of openings for the plugs. Mounted loosely on the shaft 16 is an arm 57 which carries a pawl 58 having a nose 59 adapted to enter the notches 56, the pawl being given an inward tendency by the spring 60. A link 61 is pivoted at its forward end to the arm 57. At its rear end it has a slot 62 passing around a crank pin 63 carried by the transverse shaft 45. This crank pin is shown as being on the face of a cam 65, the purpose of which will be presently described. A spring 66 connected with the link 61 and with a strap 67 loose on the crank pin tends to keep the link snugly against the pin.

Referring to Fig. 4 and assuming that the cam 65 is rotating in the direction of the arrow, it will be seen that, for approximately a quarter of a turn following the position shown, the pin 63 pulls on the spring 66 and thus draws the link 61 to the right, which carries the pawl 58 toward the right beyond the next notch 56, the incline of the notch forcing the pawl out of it whenever the link pulls the pawl. During the next quarter rotation, the movement is idle, the pin traveling in the slot to the right hand end thereof and stretching the spring. During the upper right hand quarter (approximately speaking) of the rotation of the crank pin its movement is again idle, traveling from the right hand of the slot 62 to the left hand end. Then during the remainder of the rotation, the pin shoves on the link, carrying the pawl 58 to the left, which movement causes the nose 59 to engage the next notch 56 and turn the drum on its axis the distance between adjacent notches, thus presenting to the spindles a fresh set of plugs.

The drum is accurately centered with reference to the spindles each time a fresh set of plugs is presented by a tapered projection 70 which enters a correspondingly tapered notch 71 in the drum and accurately positions it and locks it. This projection 70 consists of a nose on the upper arm 72 of a bell crank which is pivoted at 73. The other arm 74 of the bell crank carries a roller 75 which is acted upon by the projection 76 of the cam 65. A spring 77 tends to maintain the roller 75 in engagement with the cam.

Just before the left hand shoving of the crank pin 63 on the link 61 takes place, which would rotate the drum as heretofore described, the cam projection 76 engages the roller 75 and withdraws the locking projection 70 from its notch 71, freeing the drum. Then the shoving on the link 61 turns the drum so that the notch is out of registration with the nose 70. When the projection 76 clears the roll 75, therefore, the nose 70 rides on the face of the drum until the turning of the drum brings another notch opposite the nose. Then the nose springs into it under the influence of the spring 77 and thus centers and locks the drum.

It will thus be seen that, for every rotation of the shaft 45, the drum is unlocked and given a turn sufficient to carry a fresh row of plugs into position for engagement by the cutters, the milled row being swung downwardly to idle position. The plugs are placed by hand in the openings in the upper portion of the drum while the cutting operation of the horizontal row is taking place. After the cutting is completed and the drum rotates to bring a fresh row or rows into engagement, the finished row is ejected from the drum.

The ejection of the milled articles is effected automatically by spring fingers 80 on the end of the spring plate 81, which is carried beneath the drum and extends gradually toward it, the fingers lying between the ribs on the drum. The fingers thus engage beneath the heads on the plugs, and, as the drum rotates, these fingers gradually cam the plugs out of the drum. The engagement begins as the plugs turn from their horizontal position to the first position beneath the horizontal, but is not completed until they come into the second or third position, as shown in Fig. 2. When they are finally cammed out of the drum, the plugs fall on a suitable trough 85, down which they slide by gravity to the discharging point.

To insure the plugs being firmly seated on the drum during the milling operation I provide a set of rock arms 90, one for each plug being milled. These arms are pivoted on a rod 91 and are adapted to be forced toward the plugs by the turning of a flattened bar 92, which lies against the arms. This bar is turned by a cam 94 (Figs. 1 and 3) on the end of the shaft 45, this cam depressing one end of a lever 95, the other end 96 of which acts against a rock arm 97 on the rod 92. The cam 94 is timed to cause these arms to bear against the plugs just before the milling begins and continue until the milling is completed. Then they swing back to idle position a short distance away from the plugs. The levers 90 extend upwardly, as shown at 98, and thus provide means to engage any plugs which may be projecting, and cam them against their seats.

In the operation of my machine, power is supplied continuously to the main shaft 30, which is shown as provided with tight and loose pulleys 100 and 101 for this purpose. The plugs are placed by hand in the openings in the upper portion of the drum during the periods when the drum is stationary. The mechanism described for turning the drum then brings one row after another successively into the horizontal position, locks the drum at such time, and forces the plugs snugly to their sides. Then the set of milling cutters shifts in one direction and rapidly mills the notches $a$ in one side of each plug; then the cutters move in the opposite direction, drawing out of the notches milled, and milling corresponding notches in the opposite sides of the plugs, and then they return to their first or intermediate position. In this position they dwell a short time, during which the drum is released and turned to bring a fresh set of plugs to operative position, and the finished set are carried downwardly and eventually automatically stripped from the drum and deliver themselves by gravity.

It will be seen that the operation may be extremely rapid. By arranging the stock in a row and utilizing the intermediate cutters to operate first on one article and then on the opposite side of the adjacent article I minimize the idle time of the cutters. In conjunction with this rapidity of operation, there is a simplicity of mechanism and an accuracy of movement, which are also important points in my invention.

Having thus described my invention, what I claim is

1. In a milling machine, the combination of means for carrying a set of objects to be milled, a set of cutters extending respectively between adjacent objects, and means for shifting one of said sets relatively to the other set to enable the same cutter to act on adjacent sides of adjacent objects.

2. In a milling machine, the combination of a plurality of rotary cutters, a device adapted to hold a series of objects in a row, means for moving said device to position different objects in the row successively between the cutters, means for causing a relative shifting between the work and the set of cutters first in one direction and then back and continued in the opposite direction to enable milling first on one side of an object and then on the opposite side of the same object.

3. In a milling machine, the combination, with means for holding the work, of a plurality of milling cutters respectively on opposite sides of the work, parallel rotatable spindles for the cutters, means for bodily shifting the set of spindles transversely of their axes without changing their mutual relation and while they are rotating to enable milling first on one side of the work and then on the opposite side, and means for moving the work transversely of the plane in which the axes of the cutter spindles lie.

4. The combination, with a rotary drum adapted to hold a plurality of circumferential rows of articles to be milled, a cutter adapted to extend between articles of adjacent rows, and means for effecting a transverse movement between the articles and cutter to cause the same cutter to act first against one side of one article and then against the adjacent side of the adjacent article.

5. The combination of a holder having means for carrying a plurality of sets of articles to be milled, a set of cutters projecting respectively into the spaces between the sets of articles, means for moving the holder relative to the cutters in one direction to present a new set of articles to the cutters and move away the completed set, means for rotating the cutters, and automatic means for periodically shifting the set of cutters bodily toward and from the work.

6. The combination, with a rotary drum for holding a plurality of sets of articles to be milled, a set of cutters adapted to extend respectively between the articles in a set which is in position to be cut, means for rotating the drum step by step to present fresh sets of articles to cutting position and remove completed sets, means for causing a relative shifting parallel of the axis of the drum between a set of articles and the cutters to effect the milling, and means for continuously rotating the cutters.

7. The combination of a movable holder having means for carrying articles to be milled in a plurality of rows, a row of cutters, means for rotating the individual cutters, means for shifting the holder to bring a row of articles into coöperation with the row of cutters, the cutters extending between the articles, and means for then shifting the cutters relative to the articles, first in one direction and then in the other to mill opposite sides of adjacent articles.

8. The combination of a holder having means for carrying articles to be milled in a plurality of rows, a row of cutters, means for rotating the individual cutters, means for positioning successive rows of articles relative to the cutters so that the cutters extend between and alongside of the articles, means for then shifting the cutters relative to the articles, first in one direction and then in the other to mill opposite sides of adjacent articles, the set of cutters comprising one more cutter than there are articles in the row, whereby each article has a cutter on each side thereof.

9. The combination of means for holding a row of articles to be milled, a shiftable carriage, a plurality of parallel spindles mounted therein, adjacent spindles having cutters adapted to extend respectively onto opposite sides of the same article, means for shifting the carriage first in one direction and then in the other past the original position, and means for moving the row of articles transversely of the plane of movement of the carriage.

10. The combination, with a rotary drum for holding successive rows of articles to be milled, means for turning the drum step by step, a shiftable carriage, a plurality of parallel spindles mounted therein, each spindle having a cutter extending into the space alongside of a row of articles, and means for shifting the carriage laterally first in one direction and then in the other past the original position.

11. The combination of a shiftable carriage, a series of parallel spindles mounted therein, cutters carried by the respective spindles, means for continuously rotating the spindles, a movable holder for the articles to be milled arranged in a series of rows, and mechanism for holding the carriage stationary and moving the holder to present a fresh row, and then shifting the carriage in one direction to carry a cutter toward one row, then in the opposite direction beyond the original position to carry said cutter toward the adjacent row and then back to the original position.

12. In a milling machine, the combination of a rotary drum adapted to hold a series of radially projecting articles in parallel circumferential rows, a row of cutters extending respectively between the circumferential rows of articles, means for rotating the drum step by step to bring a fresh set of articles into coöperation with the cutters, means for shifting the cutters bodily first in one direction and then in the other past the original position into coöperation with the articles of different rows, and means for rotating the cutters.

13. The combination of a rotary drum having means for carrying a plurality of sets of articles, each set extending along the periphery of the drum parallel with the axis thereof, a carriage shiftable parallel with the axis of the drum, a row of cutters mounted in said carriage and respectively extending into the spaces between articles in a set, means for turning the drum step by step to present a fresh row of articles to the cutters, means for shifting the carriage, and means for rotating the cutters continuously.

14. The combination of means for holding articles in a plurality of sets, each set extending parallel with the adjacent set, the articles of each set being spaced apart and corresponding articles in the successive sets forming a row with a space between the rows, a series of milling cutters normally extending into such space, means for rotating the cutters, and means for shifting the set of cutters bodily to cause them to engage the sides of articles in a row.

15. The combination of a rotary drum having means for holding articles in a plurality of sets, each set extending parallel with the axis of the drum, the articles of each set being spaced apart and corresponding articles in the successive sets forming a circumferential row with a circumferential space between the rows, a series of milling cutters normally extending into such circumferential space, means for rotating the cutters, and means for shifting the set of cutters bodily to cause them to engage the sides of articles in a row.

16. In a milling machine, the combination of a rotary drum, a set of parallel circumferential ribs on the drum, each rib having radial openings adapted to accommodate stock, the stock in the successive ribs forming transverse rows, a transverse row of milling cutters extending into the circumferential spaces between the ribs, a shiftable carriage in which the milling cutters are mounted, means for shifting the carriage from central position first in one direction, then in the opposite direction beyond the central position, and then backwardly to the central position, and means for rotating the cutters during such shifting.

17. The combination of means for holding a row of blanks to be milled, two rotary cutters on opposite sides of said row, means for shifting the cutters laterally as a unit relatively to the row of blanks, and alternately in opposite directions, and means for moving the device for holding the row of blanks to present a fresh blank to the cutters.

18. In a milling machine, the combination of a rotary holder for the blanks to be milled, a pair of milling cutters between which the blanks may stand, means for causing relative lateral shifting between the work holder and the two cutters as a unit, first in one direction, then back and in the opposite direction and back, and means for causing a step-by-step rotation to the work holder.

19. The combination of means for holding two blanks to be milled, a rotary cutter extending into the space between the blanks, means for causing relative lateral shifting between the cutter and the two blanks as a unit, first in one direction then in the opposite direction.

20. The combination of means for holding two rows of blanks to be milled, an intermediate rotary cutter, means for shifting the cutter relatively to the blanks from said intermediate position alternately in opposite directions, and means for moving the device which holds the blanks to present new blanks to the cutter.

21. The combination of a rotary work holder having means for holding two circumferential rows of blanks, a rotary cutter extending into the space between the rows, means for causing relative movement between the cutter and work holder parallel with the axis of the holder, alternately in opposite directions past the idle point, and means for periodically rotating the work holder.

22. The combination of a rotary drum having a series of parallel circumferential ribs, radial openings arranged equi-distantly in said ribs, the corresponding openings in adjacent ribs alining, a set of cutters extending into the spaces between the ribs, means for turning the drum step by step to carry a fresh set of articles to the cutters and carry away a finished set, means for shifting the cutters parallel with the axis of the drum (during a pause in the movement of the drum) first in one direction then in the opposite direction beyond the initial point and then back to the initial point, and a stripping device adapted to engage finished articles and automatically withdraw them from the drum.

23. The combination of means for holding two blanks to be milled, an intermediate rotary cutter extending between the blanks, means for shifting the cutter laterally toward and from the blanks from the intermediate position first in one direction and then back and in the opposite direction and back.

24. The combination of means for holding two blanks to be milled, an intermediate rotary cutter, means for shifting the cutter relatively to the blanks from said intermediate position first into engagement with one blank and then back and in the opposite direction into engagement with the other blank and back, and means for causing another relative movement between the work holder and cutter to bring fresh blanks to the cutter.

25. The combination of a rotary holder for two circumferential rows of blanks to be milled, a rotary cutter adapted to extend into the circumferential space between said rows, means for shifting the cutter relative to and in the direction of the blanks first in one direction and then back and then in the opposite direction and back to enable the same cutter to mill articles in both rows, and means for rotating said holder step by step to present fresh articles.

26. The combination with a rotary holder having a series of radial openings, whereby blanks may be carried on the periphery of the holder, a milling cutter mounted on an axis normal to the holder and extending beyond the path of the blanks in the holder, and means for causing a relative shifting between the cutter and holder in a direction parallel with the axis of the holder.

27. The combination of a drum having means for carrying a series of blanks to be milled, said blanks being arranged radially about the periphery of the drum, means for turning the drum step by step, a rotary cutter extending across the blank into the circumferential space alongside of the blanks, a spindle for the cutter, the axis of which is coincident with the radius of the drum, means for rotating the cutter spindle, and means for bodily shifting the cutter spindle parallel with the axis of the drum while the spindle is rotating.

In testimony whereof, I hereunto affix my signature.

GEORGE T. TRUNDLE, Jr.